June 6, 1939.   O. C. RITZ-WOLLER   2,161,433
REAR VIEW MIRROR
Filed April 15, 1936
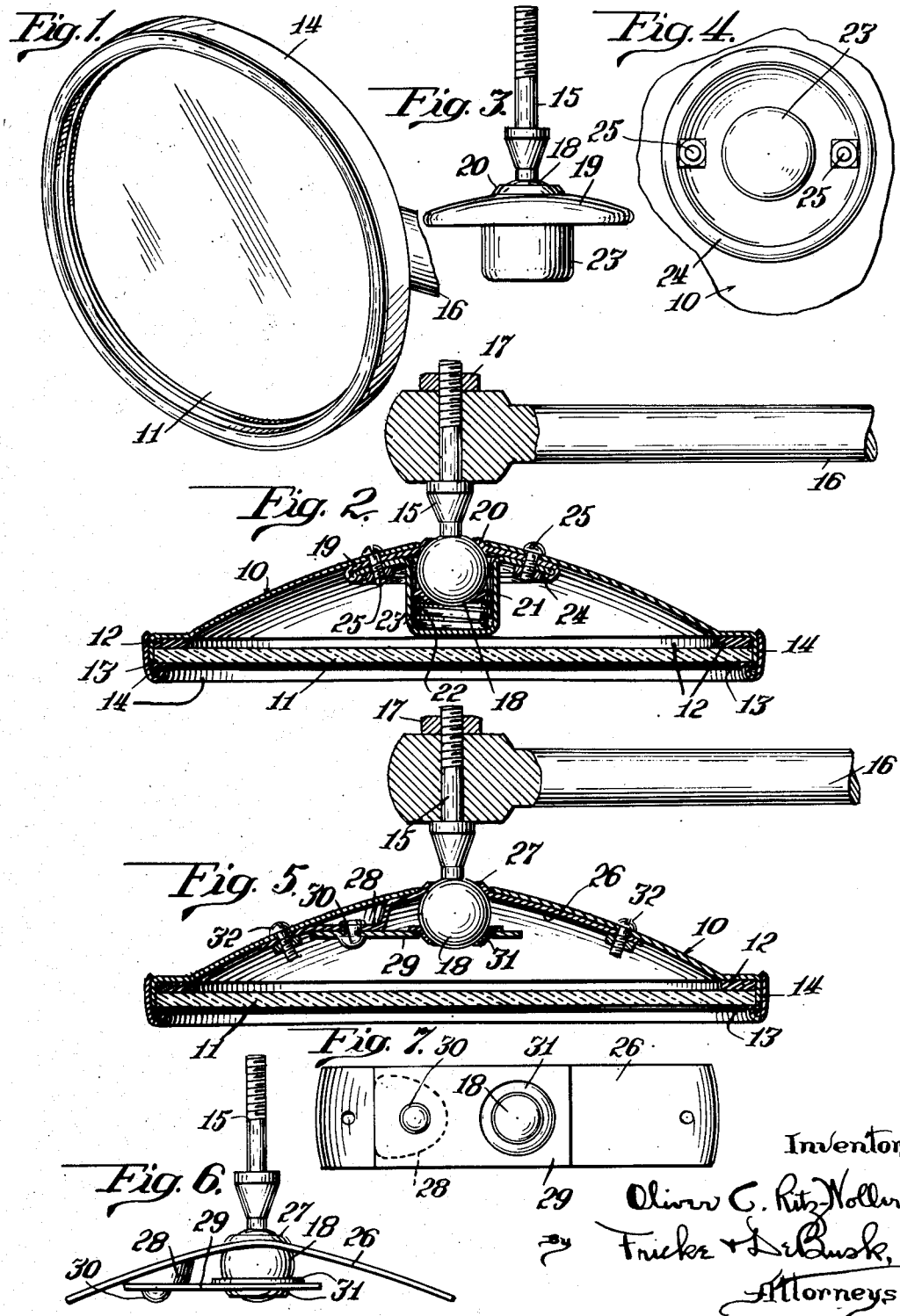

Patented June 6, 1939

2,161,433

UNITED STATES PATENT OFFICE 2,161,433

REAR VIEW MIRROR

Oliver C. Ritz-Woller, Chicago, Ill.

Application April 15, 1936, Serial No. 74,522

2 Claims. (Cl. 287—21)

My invention relates to rear view mirrors for trucks or automobiles and particularly to the type of mirror device employing a ball and socket joint arrangement for connecting the mirror with its supporting member, as is shown by my prior application Serial No. 65,985, filed on February 27, 1936, now Patent No. 2,089,463 granted August 10, 1937. It is the object of my invention to provide an improved form and arrangement of parts in a structure of this character by reason of which the production and assembly of the complete mirror may be effected more easily and cheaply. To this end, it is one of the objects of my invention to provide an improved form of ball and socket joint arrangement which can be produced in complete unit form ready for attachment complete to the casing of a mirror.

It is another object of my invention to provide an improved arrangement in a device of this type in which a spring is relied upon for holding the parts by friction in adjusted position whereby it is made unnecessary to clamp the parts rigidly in the desired adjusted position and whereby all required adjustments may be effected without the necessity for loosening the clamping parts and then again tightening them in holding position.

It is another object of my invention to improve devices of this type in sundry details hereinafter pointed out. The preferred means by which I have accomplished my several objects are illustrated in the drawing and are hereinafter specifically described. That which I believe to be new and desire to cover by Letters Patent is set forth in the claims.

In the drawing,

Fig. 1 is a perspective view of a complete mirror having my improved mounting means therein;

Fig. 2 is a central vertical sectional view through the device of Fig. 1;

Fig. 3 is a side face view of the ball and socket joint unit as employed in Fig. 2;

Fig. 4 is a front face view of a fragmentary portion of the casing of the mirror with my improved unit mounting device in position thereon;

Fig. 5 is a view similar to Fig. 2 but showing a modified form of construction;

Fig. 6 is a side face view of the ball and socket joint unit as used in the Fig. 5 device; and Fig. 7 is a front face view of a fragmentary portion of the casing of the mirror with the unit mounting device of Fig. 6 in position thereon.

Referring now to Figs. 1 to 4 inclusive, in which corresponding parts are indicated by the same reference characters, 10 indicates a forwardly dished casing member formed of sheet metal pressed into shape for holding a mirror 11 in position, gaskets 12 and 13 being employed in contact with the mirror, and the mirror and gasket being secured in position by means of a sheet metal ring member 14.

The means for mounting and supporting the mirror in position comprises a pin or bolt 15 connected at its front end as hereinafter described with the casing 10 and extending through a supporting bracket 16 in which it is secured by means of a screw-threaded nut 17, as is clearly shown in Fig. 2. In the arrangement as shown in Fig. 2, the front end portion of the pin or bolt 15 is in the form of a rounded head or ball 18 which is connected with the casing member 10 by means of a unit form of mounting and supporting means.

The unit mounting and supporting means as shown in Fig. 2 comprises a dished plate 19 having an opening therethrough with a tapered flange 20 about the opening so as to extend backward through a central opening in the dished plate 0, the ball 18 of the pin 15 being seated against the flange 20 with the pin extending through the opening and backwardly therefrom. Upon the front face portion of the ball 18 I have provided a dished washer 21 which is held in position and pressed against the ball by means of a heavy coiled spring 22 interposed between the washer and the front wall of a cup-shaped housing member 23 which surrounds the ball in spaced relation thereto. The housing member 23 is secured in position in the arrangement shown by means of a flange 24 formed on the outer edge of the dished plate 19. The plate member 19 and housing member 23 are connected together with the heavy spring 22 held under fairly heavy tension by the use of any suitable press by which the flange 24 is turned about the edge of the member 23 into the position as shown. The unit comprising the plate 19, the housing member 23, the pin 15 and the spring 22 is secured in position as shown by means of bolts 25 passing through suitable openings in the unit and in the casing member 10.

By the use of my improved arrangement as described, the angular position of the pin 15 with respect to the casing member 10 is readily adjustable at any time by the application of a fairly heavy pressure upon the casing member. The frictional engagement between the washer 21 and the head 18 and between the head and the tapered flange 20 are such, however, as to hold the casing member 10 normally in any desired adjusted angular position with respect to the pin. I have found in practice that a mirror mounted by the use of a unit of this type comprising a spring pressure device for holding the parts in frictional engagement is held steadily in position without variation of the angular position with respect to the mounting pin even when the truck upon which it is mounted is subjected to severe jostling when driven over cobblestones or the like. At the same time the casing is readily adjustable through a very fine angle at any time when desired by the application of the required pressure thereon. By reason of the arrangement of the mounting and supporting means in unit form as shown in Fig. 3, the assembly of the mirror as a whole is very easily and quickly effected.

In the arrangement shown in Figs. 5, 6 and 7, the mirror and its casing are the same as the corresponding parts of the arrangement shown in Fig. 2, except for the positioning of the bolts by which the mounting and supporting unit is connected with the casing of the mirror. These parts are, therefore, indicated by the same reference characters as are designated above in connection with Figs. 1 to 4. In the unit mounting and supporting device as shown in Figs. 5, 6 and 7, a plate 26 in the form of an elongated strip is employed in lieu of the dished disc 19, such strip 26 having an opening therethrough with a tapered flange 27 thereabout corresponding to the flange 20 of the arrangement first described. As is best shown in Fig. 5, the plate 26 is bowed backwardly to conform to the shape of the casing member 10 within the curvature of which it fits, the backward bowing being effected by a plain bending operation as contrasted with the spherical bowing of the part 19 as shown in Figs. 1 to 4. The plate 26 at one end portion is deformed to provide a seat 28 in the form of a boss upon which a heavy flat spring 29 is secured by means of a rivet 30, such plate 29 having an opening therethrough near its free end for the reception of a dished washer 31 bearing on the front face portion of the ball 18 of the pin 15. The plate 26 and spring 29 are connected together with the spring 29 held under tension so as to press the washer 31 strongly against the head 18 and to press the head 18 in turn strongly against the flange 27 of the plate 26. The unit as shown in Fig. 6 is secured in position upon the casing member 10 by means of bolts 32 passing through suitable openings in the plate 26 and the casing member 10.

As will be readily understood, the operation of the device as shown in Fig. 5 is substantially the same as the operation of the device as shown in Fig. 2, the heavy spring 29 serving to produce substantially the same effect as that above described in connection with the heavy coiled spring 22.

While I prefer to employ the form of construction as shown in my drawing and as above described, it is to be understood that the invention is not limited thereto except so far as the narrower claims may be so limited in terms, it being understood that changes may well be made in the form and arrangement of parts without departing from my invention.

I claim:—

1. In a mounting device for a mirror arranged for application in unit form on the concave face of a dished casing member, the combination of a backwardly bowed plate having an opening therethrough, a pin having a rounded head on its forward end portion mounted in said opening with the shank of the pin extending rearwardly from the face of the plate, a housing member comprising a backwardly open cup-shaped portion and a flange portion extending outwardly from the cup-shaped portion, means for mounting said flange portion rigidly on the front face of said bowed plate for holding the cup in position about the head of said pin, and a coiled spring in said cup-shaped portion strongly compressed between the end wall of the cup and the front face of the head of the pin for holding the pin in adjusted angular position with respect to said bowed plate.

2. A unit form of mounting device for mirrors and the like, comprising in combination a metal plate pressed into substantially the shape of a segment of a sphere and having an opening in centered position therethrough, a pin projecting through said opening and having a rounded head thereon seated against the inner face of the plate, a second metal plate member pressed into the form of a cylinder closed at one end and having a flange extending outwardly at its opposite end into contact with said first named plate at its edge portion, a coiled spring in said cylinder between the end wall of the cylinder and the head of the pin, and a flange on one of said plates crimped about the edge of the other plate serving to hold said spring strongly compressed for holding the pin in adjusted angular position with respect to said first named plate.

OLIVER C. RITZ-WOLLER.